United States Patent
Beaufils et al.

(10) Patent No.: US 7,314,557 B2
(45) Date of Patent: Jan. 1, 2008

(54) METHOD AND DEVICE FOR FORMING MINERAL WOOL

(75) Inventors: Sébastien Beaufils, Cernoy (FR); Christophe Wagner, Athens, GA (US)

(73) Assignee: Saint-Gobain Isover, Courbevoie (FR)

( * ) Notice: Subject to any disclaimer, the term of this patent is extended or adjusted under 35 U.S.C. 154(b) by 367 days.

(21) Appl. No.: 10/467,175

(22) PCT Filed: Feb. 13, 2002

(86) PCT No.: PCT/FR02/00541

§ 371 (c)(1), (2), (4) Date: Jan. 20, 2004

(87) PCT Pub. No.: WO02/064520

PCT Pub. Date: Aug. 22, 2002

(65) Prior Publication Data

US 2004/0144706 A1    Jul. 29, 2004

(30) Foreign Application Priority Data

Feb. 14, 2001   (FR)   ................ 01 02024

(51) Int. Cl.
*B01D 33/11*  (2006.01)
*C03B 37/04*  (2006.01)
*C03B 37/00*  (2006.01)

(52) U.S. Cl. ............ 210/380.1; 210/178; 264/8; 264/555; 264/211.1; 264/211.11; 65/461; 65/523; 65/524

(58) Field of Classification Search ............ None
See application file for complete search history.

(56) References Cited

U.S. PATENT DOCUMENTS 4,689,061 A     8/1987  Britts, II et al.
6,245,282 B1 *  6/2001  Baker et al. .......... 264/555

FOREIGN PATENT DOCUMENTS

EP    1 142 839    10/2001
WO    01/11118     2/2001

* cited by examiner

*Primary Examiner*—Krishnan S. Menon
(74) *Attorney, Agent, or Firm*—Oblon, Spivak, McClelland, Maier & Neustadt, P.C.

(57) ABSTRACT

A device for internal centrifugation of mineral fibers including a centrifuge equipped with a peripheral band perforated with orifices distributed in a plurality of annular zones arranged on top of each other, assuming that the centrifuge is in centrifugation position. The device also includes at least two annular zones whose number of orifices per unit of surface area differs by a value greater than or equal to 5%, in particular greater than or equal to 10%, and even 20%.

21 Claims, 1 Drawing Sheet

METHOD AND DEVICE FOR FORMING MINERAL WOOL

Figure 1:
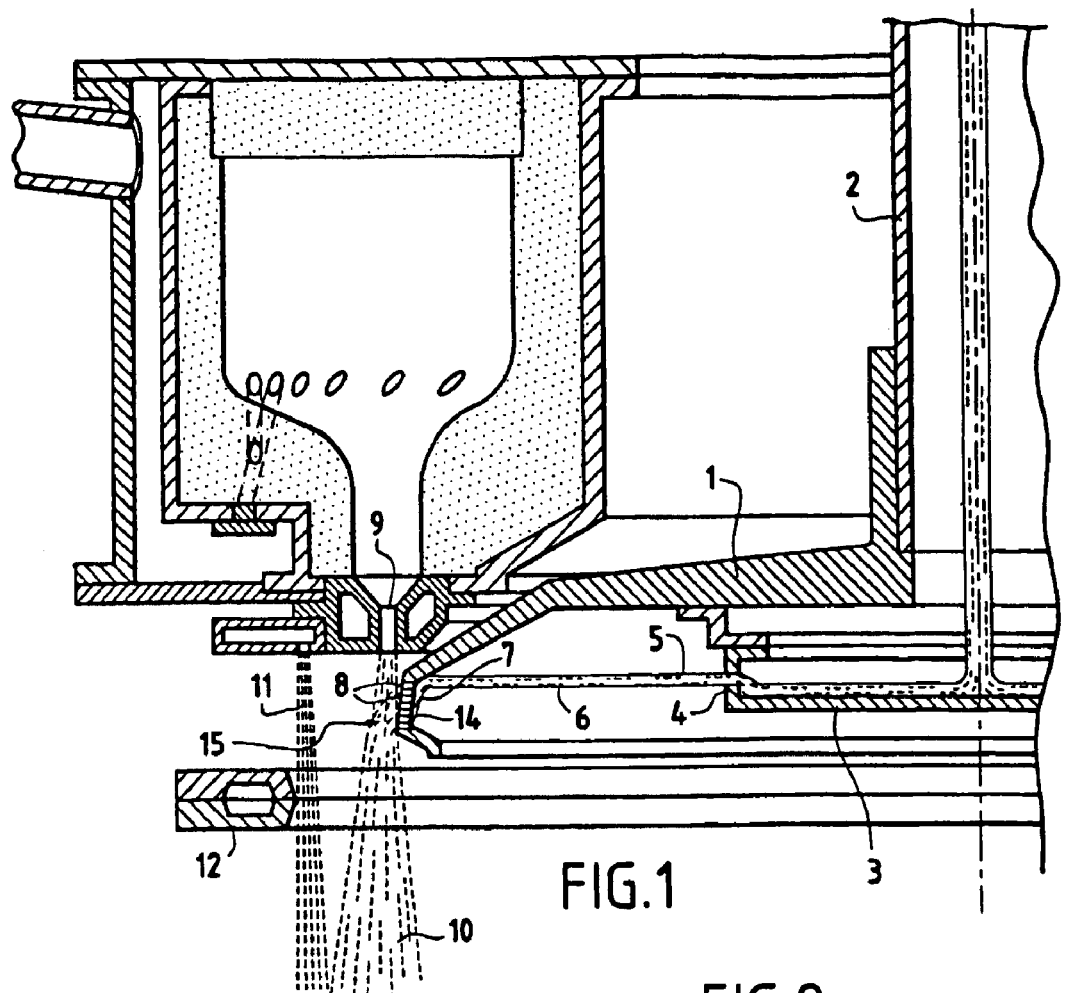

The invention relates to techniques for formation of mineral fibers or other thermoplastic materials through the process of internal centrifugation combined with drawing by a gaseous current at high temperature. It applies in particular to the industrial production of glass wool intended to be used, for example, in the composition of thermal and/or acoustic insulation products.

The fiber-formation process to which the invention relates consists of feeding a thin stream of molten glass to a centrifuge, also called a fiberization spinner, turning at high speed and perforated on its periphery by a very large number of orifices through which glass is sprayed in the form of filaments under the action of centrifugal force. These filaments are then subjected to the action of a high-temperature and high-speed annular drawing current along the wall of the centrifuge. This current thins them down and transforms them into fibers. The fibers formed are carried along by this gaseous drawing current towards a receiving mechanism generally consisting of a gas-permeable strip. This process is known as "internal centrifugation."

This process has undergone several improvements, some of them relating in particular to the fiberization spinner, others to the means of generating the annular drawing current, using a specific type of burner, for example. See in particular EP-B-0 189 354; EP-B-0 519,797; WO 97/15532 concerning this last point.

Concerning the fiberization spinner, patent FR 1,382,917 (application Feb. 27, 1963) describes a fiberization device whose principle is still widely used: the molten material is led to a basket whose vertical wall contains orifices through which the material is sprayed onto the wall of a turning body, attached to the basket, and contains a great many orifices. This wall is called the "band" of the fiberization spinner. In order to obtain good quality fiberization the orifices are distributed in annular rows and the diameters of the orifices vary according to the row to which they belong, with this diameter decreasing from the top of the band to the bottom.

In the context of the invention, the "top" of the centrifuge is defined in reference to the centrifuge in centrifugation position, i.e. according to a substantially vertical axis (of rotation).

Improvements have been made to this basic principle, as shown in particular in patent FR 2,443,436 where mechanisms make it possible to obtain a laminar flow of the molten material from the top to the bottom of the spinner band.

Thus the goal of the invention is to improve the device and the process of fiberization through internal centrifugation of mineral fibers. This improvement focuses in particular on the quality of the fibers obtained and on an increase in the yield of the process.

First, the object of the invention is a device for internal centrifugation of mineral fibers consisting of a centrifuge equipped with a peripheral band perforated with orifices distributed over a plurality of annular zones arranged on top of each other (assuming that the centrifuge is in centrifugation position) which includes at least two annular zones where the number of orifices per unit of surface area (NS) differs by an amount greater than or equal to 5%, in particular greater than or equal to 10%, and even 20%.

In a preferred method of realizing the invention, the annular zone containing the greatest number of orifices per unit of surface area is located below another annular zone containing a lower average number of orifices per unit of surface area, assuming that the centrifuge is in fiberization position.

The term "annular zone" is used to define a zone of the band of the centrifuge contained between two perpendicular planes of the axis (of rotation) of the centrifuge. In the context of the invention, such an annular zone is defined as a region where the number of orifices per unit or surface area is substantially constant over the entire part of the periphery of the band contained in the said annular zone.

The number of orifices per unit of surface area, NS, is defined as the number of orifices contained in an element of the surface of the annular zone, in particular on the order of a square centimeter, in relation to the surface area of this element of the surface. The number of orifices per unit of surface area is considered to be substantially constant if it varies by less than 0.5% over all of the elements of surface of a single annular zone. An annular zone may include a single orifice per vertical segment, but it usually contains several of them, in particular from 4 to 15. The term "vertical segment" refers to a part of the annular zone limited on the vertical axis by each of the planes defined above, as long as an average of only one orifice on a horizontal axis is observed there, assuming that the centrifuge is in fiberization position.

Normally, mineral fibers are manufactured with a centrifuge where the number of orifices per unit of surface area is constant over the entire height of the centrifuge band. In fact, a conventional centrifuge is perforated through electrical discharge machining, with a comb composed of electrodes distributed in line where the pitch between electrodes is constant. After simultaneous perforation of orifices in a vertical column, the comb is moved to carry out the perforation of the next column, after moving the comb along the band by a distance corresponding to the horizontal gap between the center of consecutive holes.

This technique permits very precise perforation and the variations in the number of orifices per unit of surface area are extremely low, specifically less than 1 per one thousand.

A centrifuge generally contains between 2000 and 40,000 orifices, specifically for average diameters of the centrifuge of 200 mm to 800 mm, respectively.

It has proven to be possible to increase significantly the quality of the fiber mat, in particular its mechanical properties, while obtaining a very significant reduction in the consumption of energy, and thus the yield of the fiberization process, using a device prepared according to the invention.

This effect is especially notable in that, at constant pull rate, it is known that energy consumption decreases when the number of orifices for the same band height increases, because the more the molten material is divided, the less energy is required to draw it. When the number of orifices is increased for the same band height with a conventional centrifuge, however, the quality of the fiber mats produced does not increase, and even tends to decrease, while with the device prepared according to the invention it is possible to improve the properties of the products and the yield of the process at the same time.

Recall that in the text, reference was made to a centrifuge observed in the position of centrifugation, i.e. with the band, including the orifices, arranged in a substantially vertical manner, around the axis along which the molten material is carried during fiberization. The molten material is carried through the "top" of the centrifuge in this position. The base of the centrifuge is substantially horizontal and the annular zones are parallel to this base and are superimposed on each other in this arrangement.

A centrifuge according to the invention contains at least two superimposed annular zones, the lower one having a greater number of orifices per unit of surface area than the one located above it. In a preferred method of realization the centrifuge includes at least three superimposed annular zones and each of these zones includes a greater number of orifices per unit of surface area than the one in the closest annular zone located above the annular zone considered.

According to a preferred method of realization the orifices of each zone are grouped in rows, with a diameter of orifice (d) substantially constant in each annular zone and decreasing from one annular zone to another, from the top to the bottom of the peripheral band of the centrifuge in centrifugation position.

In the invention, it is also advantageous that at least two adjacent rows have orifices of different diameters, and more specifically, that the rows have, from the top to the bottom of the peripheral band, decreasing diameters of orifices (generally all orifices of a single row have the same diameter). Thus one can anticipate, from the top to the bottom, n row(s) of orifices of a given diameter, then p row(s) or orifices of a smaller diameter, then t row(s) of orifices of a still smaller diameter, etc. with n, p and $t \geq 1$.

For example, one could have a first annular zone, ZA1, consisting of n rows, a second, ZA2, consisting of p rows, and a third, ZA3, consisting of t rows.

By thus establishing a sort of decreasing "gradient" in the size of orifices from top to bottom, an improvement in the quality of fiberization has been observed. Thus it has been possible to reduce the differences in the way in which filaments coming from the highest rows were fiberized in relation to those from the lowest: this "gradient" permits a development of primary filaments exiting the orifices and a drawing process that limits crossing of trajectories, and thus impact, between the fibers being drawn from different rows of orifices, hence the improved quality observed.

This configuration is especially adapted to the production of less dense mineral wools.

In certain cases, on the other hand, one wants to encourage impact between fibers in order to reduce their length. These cases correspond to the production of dense mineral wools, particularly suitable for panels used in roofing. In these cases one could, for example, alternate the size of the orifices from one zone to another, and one can thus anticipate, from the top to the bottom, n row(s) of orifices of a given diameter, then p row(s) of orifices of a greater diameter, then t row(s) of orifices of a diameter smaller than those of the orifices of the row located above, etc.

It would be advantageous to have the rows spaced apart from each other by a distance between 1 and 2 mm, in particular from 1.2 to 1.8 mm, with preferably a pitch from one row to another of 1 to 2 mm, for example 1.2 to 1.6.

Preferably, the diameter (d) of at least a part of the orifices of the centrifuge is at least 1.5 or 1.2 mm, in particular from 1.1 to 0.5 mm, for example between 0.9 and 0.7 mm.

According to another method of realization of the device according to the invention, the distance, D, between the centers of the neighboring orifices closest to a single annular zone is substantially constant over all of a single annular zone and this distance, D, varies from one zone to another by at least 3%, or even at least 5% and even 10% or more, and decreases from top to bottom, assuming that the centrifuge is in fiberization position.

Preferably the distance, D, is between 0.8 and 3 mm, for example between 1 and 2 mm and even between 1.4 and 1.8 mm.

It would be advantageous that the centrifuge according to the invention be chosen with an average diameter, DM, less than or equal to 800 mm, in particular at least 200 mm.

According to a preferred method of realization, the device according to the invention includes at least one mechanism of generating a high-temperature gaseous drawing jet in the form of an annular burner, in particular as described in the patents EP 0 189 354 and EP 0 519 797 by the applicant.

It would be advantageous that the annular burner be a tangential burner which includes a mechanism of giving the gaseous drawing jet a tangential component in relation to the outer horizontal edge of the centrifuge, in particular as described in patent EP 0 189 354 by the applicant.

Thus it is possible to obtain an inclination angle of the gaseous drawing jet in relation to the axis of the burner.

It is also possible to use a heating mechanism "internal" to the centrifuge, of the internal burner type. This may play different roles, in particular terminating the thermal conditioning of the molten glass in the "basket" of the centrifuge (term explained below, using the figures), maintaining at an appropriate temperature the glass reserve in the centrifuge in order to continuously remelt the fibers which are susceptible to adhering to the external walls of the centrifuge.

It may be advantageous to combine the "external" heating method, of the annular inductor type, with this internal heating method; this also permits better control of the temperature of the glass reserve and the remelting of the adhered fibers. In fact, it has been observed that, generally, at low pull rates it was sufficient simply to have recourse to an internal burner, while at high pull rates, the annular inductor proved to be necessary, and the possible addition of the internal burner is beneficial.

The object of the invention is a process of formation of mineral fibers by internal centrifugation, combined with gaseous drawing at high temperature, in particular implementing the device above. The material to be fiberized is emptied into a centrifuge whose peripheral band is perforated with orifices distributed over a plurality of annular zones arranged on top of each other, assuming that the centrifuge is in the centrifugation position; it includes at least two annular zones, ZA1 and ZA2, whose number of orifices per unit of surface area NS1, NS2, differs by a value greater than or equal to 5%, in particular greater than or equal to 10% and even 20%, and the annular zones containing the greatest number of orifices per unit of surface area is located below the other annular zone, assuming that the centrifuge is in fiberization position.

It is advantageous that the centrifuge be the one whose characteristics are described above.

It is advantageous that the hot gaseous drawing be accomplished by an annular burner whose parameters of operation may be selected as follows:

preferably, it is possible to regulate the temperature of the gases leaving the burner to at least 1350° C., in particular at least 1400° C. and, for example, between 1400 and 1500° C., in particular between 1430 and 1470° C. The temperature is then adjusted according to the type of composition of the mineral fibers, in particular according to its viscosimetric behavior, it is advantageous to regulate the speed of the gases exiting the burner to at least 200 m/s, measured just at the exit of the lips of the burner, in particular at values between 200 and 295 m/s, finally, it is preferable to regulate the annular width of the gases exiting the burner to values between 5 mm and 9 mm.

When the process of the invention has recourse to a means of harnessing the hot drawing gases and/or the material released from the orifices of the centrifuge under the effect of centrifugal force, it is advantageous that the means be a gas blowing collar which is at ambient temperature at most, and at a feed gas pressure between 0.5 and $2.5.10^5$ Pa, in particular 0.7 to $2.10^{-5}$ Pa.

One can have recourse to an inductor to heat the lowest zone of the centrifuge and avoid or limit the creation of a temperature gradient over the height of the centrifuge.

Another object of the invention is the use of mineral fibers obtained by the device and/or the process described above to manufacture thermal and/or insulation products.

Figure 2:
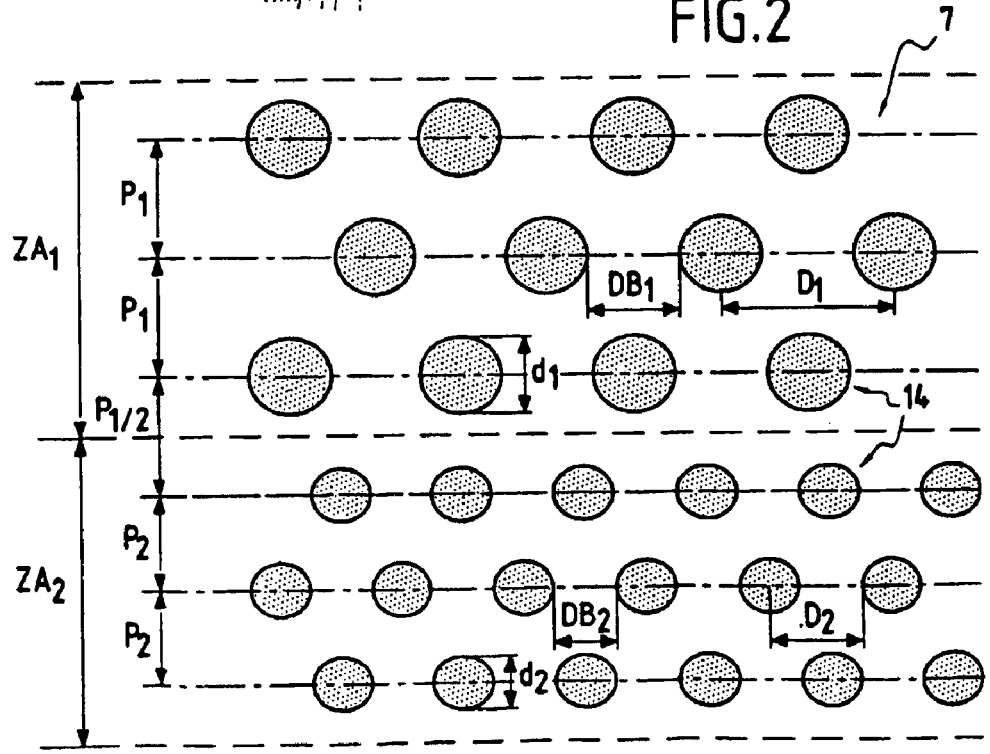

The invention will be detailed below using non-restrictive examples illustrated by the following figures:

FIG. 1: a partial view of the centrifugation device according to the invention,

FIG. 2: a partial view of the centrifuge according to the invention.

FIG. 1 thus represents a partial view of a system of internal centrifugation using hot gas drawing adapted based on those known from prior art and described, in particular, in patents EP-91 866, EP 189-354 and PE 519-797, which can be referred to for more details on the general aspects of this method of fiberization.

The system includes a centrifuge 1 attached to a shaft 2. The shaft and the centrifuge are animated by a movement of rapid rotation using an engine not pictured. The shaft 2 is hollow and the glass in the molten state flows from the feeding mechanism not represented in shaft 2 up to the "basket" 3 in which the molten glass spreads. The basket 3 is also carried along by rotation such that the molten glass is sprayed onto the peripheral wall 4 which is perforated with orifices and, from there, in the form of voluminous threads 6 on the peripheral wall 7, usually named "band" of the centrifuge 1, which will form on this wall a permanent reserve of molten glass to supply the circular orifices 14 perforated into said wall. This wall 7 is inclined by about 5 to 10° in relation to the vertical. Very many circular orifices 14 arranged in rows, come out of the flow cones 8 extending into pre-fibers 15, projected into the annular gaseous current emitted from the burner 9. Under the effect of this current, these pre-fibers stretch, their terminal portion generating discontinuous fibers 10 which are then collected under the centrifuge. The system also contains a blowing column 11 which creates a "cloud of gas" surrounding the annular gas current generated by the burner 9. There is also an option to use an induction current 12 under the centrifuge 1 and/or an internal burner not pictured.

Under the standard conditions, the gap between the lines passing through the center of two parallel rows of orifices, termed the pitch, is constant over the entire height of the band. Under these conditions, the distance between the centers of neighboring orifices in the same row is also constant.

Thus, in a standard centrifuge, the number of orifices per unit of surface area is constant over the entire surface of the band.

Under standard operating conditions, such a device permits obtaining fibers of an average diameter of at least 2 μm, particularly about 3 to 12 μm.

Thus the invention consisted of optimizing the fiberization process by modifying the distribution of orifices on the band 7 of the centrifuge.

The most significant adaptation made in the context of the invention appears on FIG. 2.

FIG. 2 represents a partial frontal view of the band 7 of the centrifuge 1, where the orifices 14 perforated in said band are shaded.

In this figure are pictured the two superimposed annular zones ZA1 and ZA2, ZA2 being below ZA1 when the device is viewed in fiberization position. In the case pictured, each of these annular zones includes three circular rows of orifices 14. In the annular zone ZA1 the rows present a pitch P1, the orifices a diameter d1, the distance D1 separates the centers of the closest orifices 14, the distance between the closest edges of neighboring orifices is DB1, and the number of orifices per unit of surface area is NS1 in the zone ZA1. In the annular zone ZA2, these parameters are respectively P1, d2, D2, DB2, and NS2.

The pitch between ZA1 and ZA2 is called P1/2.

Note on one hand that d2 is less than d1, and that P2 and D2 are, respectively, less than P1 and D1. As result, NS2 is very much greater than NS1.

This representation is in no way restrictive and a band 7 of a centrifuge 1 may contain more than two annular zones, each of said zones containing at least one series of orifices 14.

In order to illustrate the value of the centrifuge according to the invention, comparative testing was performed, with, on one hand, a standard centrifuge, and on the other hand, a centrifuge according to the invention. The characteristics of the two centrifuges which were selected to have the same average diameter, DM, and the same band surface area, and an identical height of perforated band, are presented in table 1. Each of these centrifuges includes three annular zones each consisting of several rows of orifices of constant diameter and spacing in a row.

The number of orifices per row is noted as NO, and the number of orifices per unit of surface area, NS, is calculated as follows: $NS=NO/(\pi.D.P)$. It is expressed here in number of orifices per mm.

Note that the number of orifices per unit of surface area is constant for the standard centrifuge. In the case of the centrifuge according to the invention, it varies by annular zone and this number, NS, is lower than the one of the standard centrifuge for the highest annular zone, ZA1, and then higher than that of the standard centrifuge for the other annular zones, ZA2 and ZA3. Note that for the centrifuge according to the invention, the number of orifices per unit of surface area increases with the zone, from the top to the bottom of the centrifuge, by about 25 to 30% from one zone to another.

The two centrifuges were manufactured from the same alloy, known under the reference SG30, produced in particular by the company SEVA. The standard centrifuge was perforated using the electroerosion technique described above, while the orifices of the centrifuge according to the invention were perforated using electron bombardment. Laser perforation could also be considered.

Products were manufactured with each of the centrifuges under equivalent pull conditions.

The types of products manufactured, the conditions of fiberization and the mechanical properties measured on the products obtained are reported in table 2.

The fineness of the fibers is determined by the value of their micronaire (F) under 5 g. The measurement of micronaire, also called "fineness index," takes into account the specific surface area by measuring the loss in aerodynamic load when a given quantity of fibers extracted from a non-sized mat is subjected to a given pressure of a gas—generally air or nitrogen. This measurement is normal in mineral fiber production units, it is standardized (DIN 53941 or ASTM D 1448) and it uses a device called "micronaire device."

The products obtained are of the same type, that is, of the same nominal thickness, the same density. To obtain them, a single burner was used, in this case a tangential burner, with an incline of the gas jet of about 10°. The baskets used are of the same geometry.

These products are all impregnated with the same formophenolic binder, with 4.7% binder in relation to the weight of the fibers.

The energy necessary to obtain products of the same type is compared, that is, in particular, the quantity of air and of gas supplied for combustion.

The properties measured on products of the same type with each centrifuge are also compared.

The thickness recovery is defined as the ratio (in %) between the thickness after compression test and the nominal thickness. It must be noted that the thickness of the product manufactured before compression testing is greater than the nominal thickness. In the case of the tests mentioned, the thickness of the product manufactured is 144 mm for a nominal thickness of 80 mm.

From table 2 it can be deduced that the thickness of the fiber mat unloaded after 12 days of compression testing is about 90% of the original thickness (manufacturing thickness) of the fiber mat with the centrifuge according to the invention, and about 80% of the initial thickness with a standard centrifuge.

To conduct the compression test above, panels of fiber mat are prepared after manufacture and loaded to obtain a compression rate of 8/1, i.e. in the case mentioned a compressed thickness of about 18 mm. After the compression time specified (12 days, 1 month), the panels are unloaded (4 per compression time) and the average thickness after compression test is determined.

The tensile strength is determined based on a test specimen in the form of ring cut with a punch in a mat of fibrous product. The "tensile strength" is expressed as the limit of the tensile force (breaking force of the ring torn out by two circular and parallel mandrels 12.5 mm in radius, with a load speed of 300 mm/min) in relation to the mass of the test specimen and is expressed in gf/g.

The test specimen, loaded at the start of the test, is a substantially elliptical toric ring of 122×76 mm long and short axes and 26 mm thickness of torr. The 15 test specimens are tested by product. This test refers to norms BIFT 5012-76 and ASTM C 681-76.

The tensile strength is measured on the product after manufacture and, in order to estimate the product's capacity for aging, after an autoclave test. The duration of the autoclave test is 15 minutes, at a temperature of 107° C., a pressure of 0.8 bar and humidity of 100%.

From table 2 it may be observed that for a product of the same type, sharply improved mechanical properties are obtained with the device according to the invention compared to the standard device and at the same time, the energy needed to produce the fibers is significantly reduced.

In fact, the pressure of the burner is lower, about 20% less with the centrifuge according to the invention compared to the results with the standard centrifuge. At the same time, the outputs of fluid, air and gas are relatively smaller, by about 10%. The energy yield of the process is thus very advantageously increased with the centrifuge according to the invention.

The improvement in mechanical properties relates both to the thickness recovery, which is about 10% greater with the centrifuge according to the invention compared to products obtained with a standard centrifuge, and also the tensile strength, which is improved by about 20%.

In addition from these remarkable results, it was noted that, unexpectedly, the increase in the number of orifices of the centrifuge does not have a negative effect on the life span of the centrifuge, when the latter is made according to the instructions of the invention.

Under the fiberization conditions defined in table 2, the life span of the centrifuge according to the invention was about 370 hours and that of the standard centrifuge was about 300 hours.

In the same way, it is noted that the quality of the products does not vary significantly with the time of use in fiberization of a spinner, although it might have been feared that the increase in the number of holes per unit of surface area may lead to accelerated aging of the centrifuge accompanied by a rapid deterioration in the properties of the product during fiberization with the same spinner.

It is noted that the configuration described for the centrifuge according to the invention in table 1 is especially advantageous from a geometric point of view. In fact, while increasing the number of orifices in the centrifuge, the inventors were able to define a geometric configuration where the space between the edges of the orifices, DB1, is increased in relation to that of the standard centrifuge in the annular zone, ZA1, where the orifices have the largest diameter, D1, and where corrosion and erosion are the most active. In the median annular zone, ZA2, the space between edges of orifices, DB2, is identical in both configurations, and in the annular zone, ZA3, with the smallest diameter, D3, the configuration chosen permits decreasing the distance between edges of orifices, DB3, which is not harmful because corrosion and erosion are not as great there. Thus, very advantageously, the mechanical properties of the centrifuge according to the invention are preserved, and its life span can be maintained or increased compared to a standard centrifuge, while considerably increasing the number of orifices.

The invention is not limited to these types of realizations and must be interpreted in a non-restrictive manner, encompassing any device for internal centrifugation of mineral fibers which contains a centrifuge equipped with a peripheral band perforated with orifices distributed in a plurality of annular zones arranged on top of each other, assuming that the centrifuge is in centrifugation position, with at least two annular zones whose number of orifices per unit of surface area (NS) [differs by (word missing?)] a value greater than or equal to 5%, in particular greater than or equal to 10%, and even 20%, as well as any process using such an internal centrifugation device.

TABLE 1

|  | Standard centrifuge | Centrifuge according to the invention |
| --- | --- | --- |
| Diameter (mm) | 600 | 600 |
| Height of perforated band (mm) | 34.25 | 34.25 |
| Number of annular zones (ZA) | 3 | 3 |
| First annular zone ZA1 |  |  |
| number of rows | 4 | 6 |
| diameter d1 | 1.0 | 0.9 |
| distance D1 | 1.7 | 1.8 |
| distance between edge DB1 | 0.7 | 0.9 |
| pitch P1 | 1.49 | 1.56 |

TABLE 1-continued

|  | Standard centrifuge | Centrifuge according to the invention |
|---|---|---|
| number of orifices per row NO1 | 1100 | 1047 |
| orifices/surface area NS1 | 0.39 | 0.36 |
| pitch P1/2 | 1.49 | 1.75 |
| Second annular zone ZA2 | | |
| number of rows | 7 | 8 |
| diameter d2 | 0.9 | 0.8 |
| distance D2 | 1.7 | 1.6 |
| distance between edge DB2 | 0.8 | 0.8 |
| pitch P2 | 1.49 | 1.39 |
| number of orifices per row NO2 | 1100 | 1178 |
| orifices/surface area NS2 | 0.39 | 0.45 |
| pitch P2/3 | 1.49 | 1.55 |
| Third annular zone ZA3 | | |
| number of rows | 13 | 12 |
| diameter d3 | 0.8 | 0.7 |
| distance D3 | 1.7 | 1.4 |
| distance between edge DB3 | 0.9 | 0.7 |
| pitch P3 | 1.49 | 1.22 |
| number of orifices per row NO3 | 1100 | 1345 |
| orifices/surface area NS3 | 0.39 | 0.58 |

TABLE 2

|  | Standard centrifuge | Centrifuge according to the invention |
|---|---|---|
| Type of product: | | |
| Nominal thickness (mm) | 80 | 80 |
| Density (kg/m$^3$) | 9.5 | 9.5 |
| Micronaire (l/mm, 5 g) | 13.4 | 13.5 |
| λ (mW/mK) | 41.6 | 41.2 |
| Fiberization conditions | | |
| Pull (t/d) | 23 | 23 |
| Burner | tangential | tangential |
| Basket | standard | standard |
| Burner pressure (mm CE) | 668 | 562 |
| Air output (Nm$^3$/h) | 1953 | 1743 |
| Gas output (Nm$^3$/h) | 120 | 111 |
| Mechanical properties produced | | |
| Thickness recovery after twelve days | 126 | 131 |
| Thickness recovery after one month | 116 | 126 |
| Tensile strength after manufacture (gf/g) | 180 | 220 |
| Tensile strength after 15 minutes autoclave (gf/g) | 126 | 150 |

The invention claimed is:

1. Device for internal centrifugation of mineral fibers, comprising:
a centrifuge equipped with a peripheral band perforated with orifices distributed in a plurality of annular zones arranged on top of each other, assuming that the centrifuge is in centrifugation position,
at least two annular zones whose number of orifices per unit of surface area differs by a value greater than or equal to 5%, wherein a distance between centers of adjacent orifices in any of said annular zones is substantially constant, wherein the distance between centers of adjacent orifices varies from one of said zones to another, and wherein the distance between centers of adjacent orifices decreases from a top to a bottom of the centrifuge.

2. Device according to claim 1, wherein the annular zone containing the greatest number of orifices per unit of surface area is located below another annular zone containing a lower average number of orifices per unit of surface area, assuming that the centrifuge is in a centrifugation position.

3. Device according to claims 1, wherein the orifices of each annular zone are grouped in rows, with a diameter of the orifices substantially constant in each annular zone and decreasing from one annular zone to another, from a top to a bottom of a peripheral band of the centrifuge in centrifugation position.

4. Device according to claim 3, wherein the rows are spaced from each other at a distance between 1 and 2 mm, with a pitch from one row to the next of between 1 and 2 mm.

5. Device according to claim 1, wherein the diameter of at least a part of the orifices of the centrifuge is at most between 1.5 and 1.2 mm.

6. Device according to claim 1, wherein the distance between centers varies from one zone to another by at least 3%.

7. Device according to claim 1, wherein the centrifuge presents an average diameter less than or equal to 800 mm, by at least 200 mm.

8. Device according to claim 1, further comprising at least one mechanism of generating a high-temperature gaseous drawing jet in the form of an annular burner.

9. Device according to claim 8, wherein the annular burner is a tangential burner which includes a mechanism of giving the gaseous drawing jet a tangential component in relation to an external horizontal edge of the centrifuge.

10. Use of the mineral fibers obtained by the device according to claim 1 to manufacture at least one of thermal and acoustic insulation products.

11. Process of formation of mineral fibers by internal centrifugation associated with gaseous drawing at high temperature, comprising the steps of:
emptying a material to be fiberized into a centrifuge whose peripheral band is perforated with orifices distributed in a plurality of annular zones arranged on top of each other with the centrifuge in centrifugation position, including at least two annular zones whose number of orifices per unit of surface area differs by a value greater than or equal to 5%, wherein a distance between centers of adjacent orifices in any of said annular zones is substantially constant, wherein the distance between centers of adjacent orifices varies from one of said zones to another, and wherein the distance between centers of adjacent orifices decreases from a top to a bottom of the centrifuge, and wherein one of the annular zones containing the greatest number of orifices per unit of surface area is located below the other annular zone, assuming that the centrifuge is in centrifugation position; and
forming mineral fibers by extruding the material through the orifices.

12. Use of the mineral fibers obtained by the device according to claim 11 to manufacture at least one of thermal and acoustic insulation products.

13. Device according to claim 1, wherein the number of orifices per unit of surface area in said at least two annular zones differs by a value greater than or equal to 10%.

14. Device according to claim 1, wherein the number of orifices per unit of surface area in said at least two annular zones differs by a value greater than or equal to 20%.

15. Device according to claim 3, wherein the rows are spaced from each other at a distance between 1.2 and 1.8 mm, with a pitch from one row to the next of between 1.2 and 1.6 mm.

16. Device according to claim 1, wherein the diameter of at least a part of the orifices of the centrifuge is between 1.1 and 0.5 mm.

17. Device according to claim 1, wherein the diameter of at least a part of the orifices of the centrifuge is between 0.9 and 0.7 mm.

18. Device according to claim 1, wherein the distance between centers varies from one zone to another by at least 5%.

19. Device according to claim 1, wherein the distance between centers varies from one zone to another by at least 10%.

20. Process according to claim 11, wherein the number of orifices per unit of surface area in said at least two annular zones differs by a value greater than or equal to 10%.

21. Process according to claim 11, wherein the number of orifices per unit of surface area in said at least two annular zones differs by a value greater than or equal to 20%.

* * * * *